US010524603B2

(12) United States Patent
 Pastor

(10) Patent No.: US 10,524,603 B2
(45) Date of Patent: Jan. 7, 2020

(54) PLATFORM FOR FOOD SERVICE AND PREPARATION

(71) Applicant: Timothy Pastor, Bellmore, NY (US)

(72) Inventor: Timothy Pastor, Bellmore, NY (US)

( * ) Notice: Subject to any disclaimer, the term of this patent is extended or adjusted under 35 U.S.C. 154(b) by 865 days.

(21) Appl. No.: 14/821,372

(22) Filed: Aug. 7, 2015

(65) Prior Publication Data

US 2016/0066736 A1    Mar. 10, 2016

Related U.S. Application Data

(60) Provisional application No. 62/047,214, filed on Sep. 8, 2014.

(51) Int. Cl.
 *A47J 27/00*    (2006.01)

(52) U.S. Cl.
 CPC .................. *A47J 27/002* (2013.01)

(58) Field of Classification Search
 CPC .................. F16B 2/20; A47J 27/002
 USPC .......................................... 99/449
 See application file for complete search history.

(56) References Cited

U.S. PATENT DOCUMENTS

| | | |
|---|---|---|
| 523,068 A | 7/1894 | Gaul |
| 2,112,944 A | 4/1938 | Wolcott |
| 2,795,120 A | 6/1957 | Treff |
| 3,951,079 A | 4/1976 | Tolleson |
| 3,992,738 A * | 11/1976 | Kiefer ............... B63B 35/812 441/70 |
| 4,375,934 A * | 3/1983 | Elliott ............... E04F 21/1822 248/354.7 |
| D357,170 S | 4/1995 | Wellsfry |
| 5,634,617 A | 6/1997 | Morris |
| D395,195 S | 6/1998 | Heiberg et al. |
| D401,810 S | 12/1998 | Swift |
| 5,848,712 A | 12/1998 | Weir |
| D446,688 S | 8/2001 | Vanello |
| D507,933 S | 8/2005 | Carmichael |
| 7,207,290 B2 * | 4/2007 | Nichols ............... A01K 5/0114 108/116 |
| 8,251,357 B2 * | 8/2012 | Young ............... A47J 47/005 269/15 |
| 8,550,014 B1 | 10/2013 | Mariani |
| 9,113,725 B1 * | 8/2015 | Nipp ............... A47F 5/0068 |
| 2004/0112259 A1 * | 6/2004 | Zeiders ............... A47B 23/041 108/43 |
| 2007/0062939 A1 | 3/2007 | Davis et al. |
| 2008/0041278 A1 * | 2/2008 | Goldberg ............ A47B 23/001 108/26 |
| 2008/0061020 A1 | 3/2008 | Kaisler |
| 2008/0197087 A1 | 8/2008 | Hunter |
| 2008/0265108 A1 | 10/2008 | Felici |
| 2012/0104214 A1 | 5/2012 | St. Jacques |
| 2012/0195734 A1 | 8/2012 | Glencer |

* cited by examiner

*Primary Examiner* — Theodore J Stigell
*Assistant Examiner* — Spencer H. Kirkwood
(74) *Attorney, Agent, or Firm* — The Farrell Law Firm, P.C.; John F. Gallagher, III

(57) ABSTRACT

A platform for food service and preparation is provided. The platform includes a base member that is supportable on a cooking vessel and a stabilizing member that supports the base member in a fixed orientation relative to the cooking vessel when the base member is supported on the cooking vessel.

20 Claims, 4 Drawing Sheets

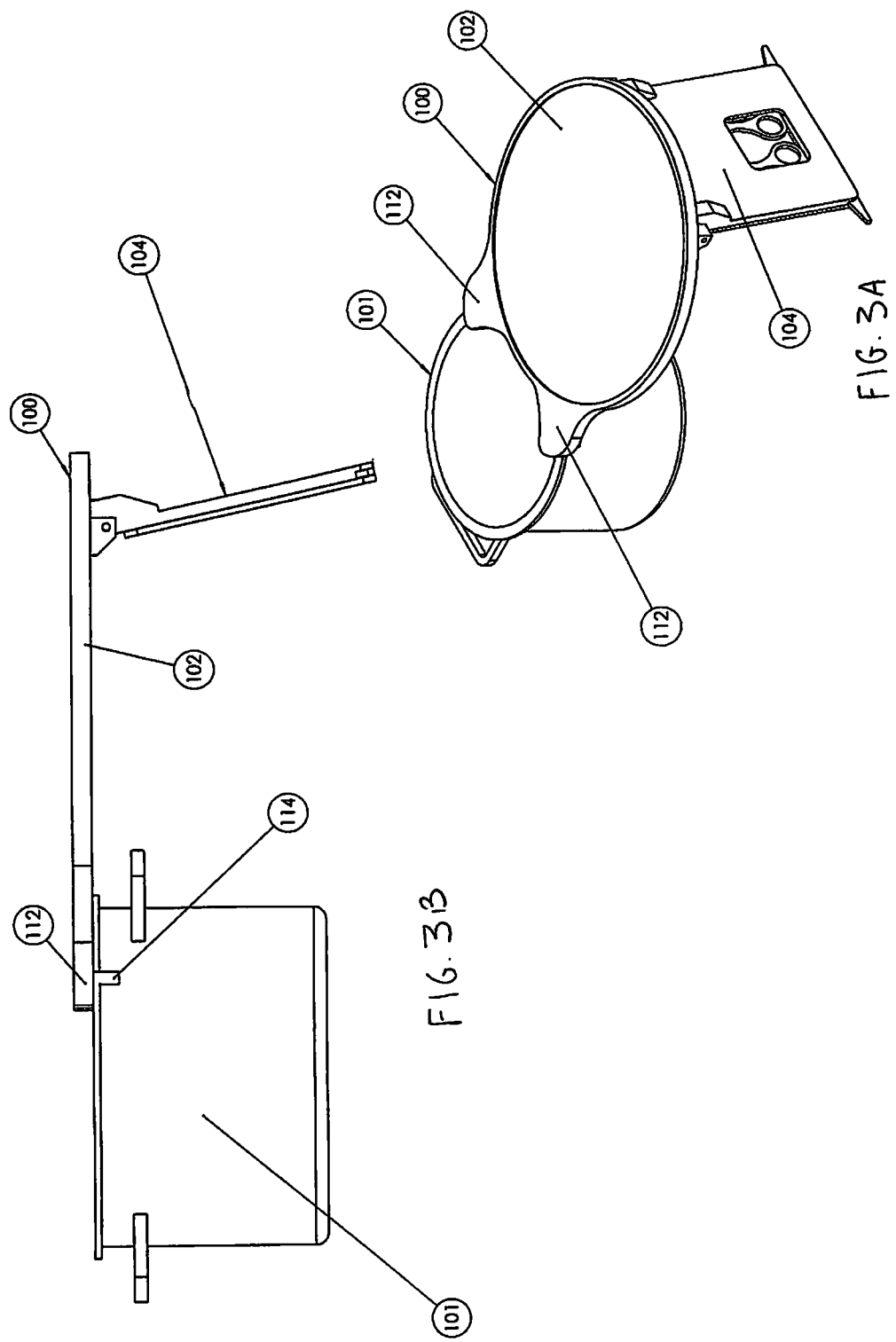

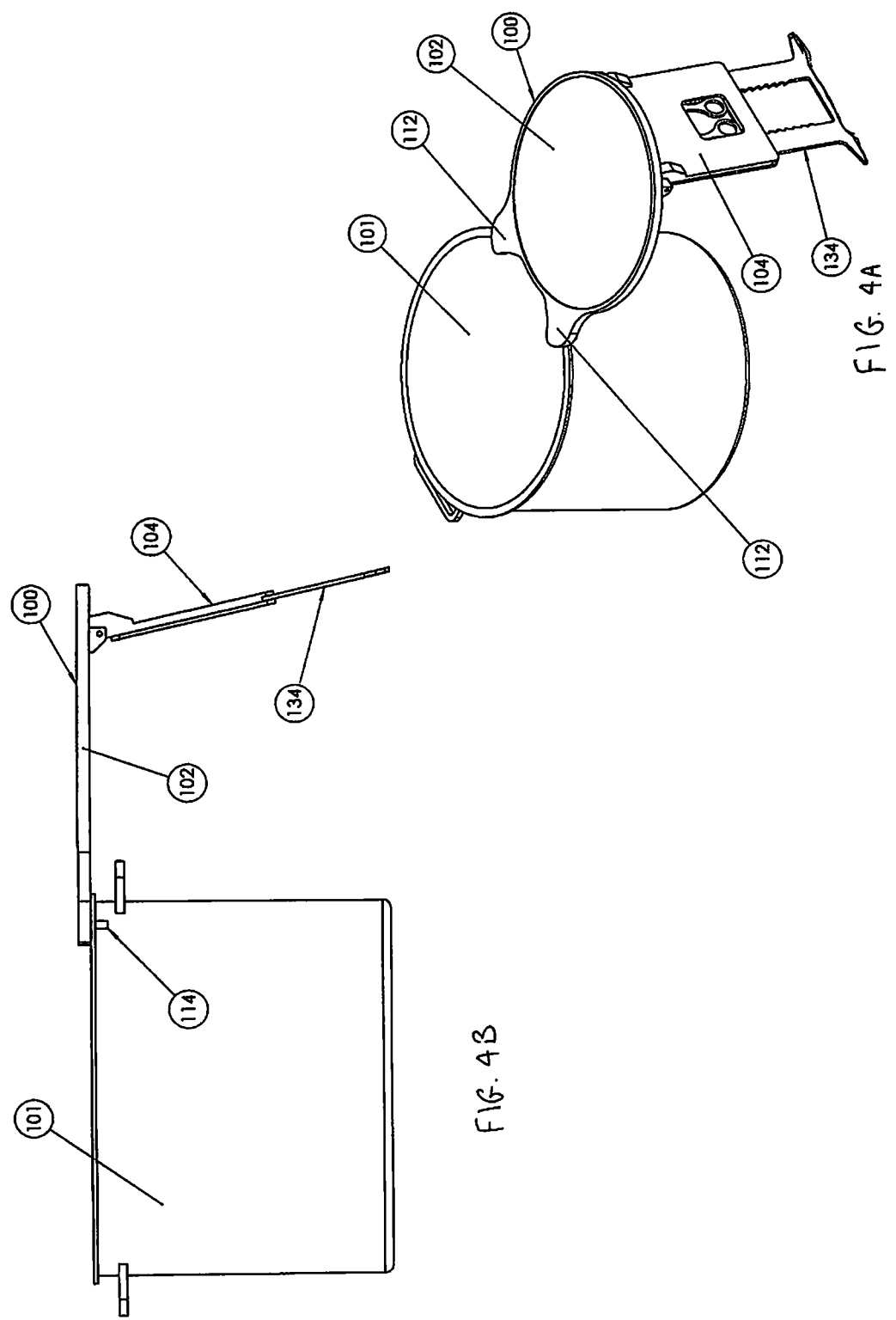

PLATFORM FOR FOOD SERVICE AND PREPARATION

PRIORITY

The present disclosure claims priority under 35 U.S.C. § 119(e) to U.S. Provisional Application Ser. No. 62/047,214, which was filed in the U.S. Patent and Trademark Office by Timothy Joseph Pastor on Sep. 8, 2014, the entire disclosure of which is incorporated herein by reference.

BACKGROUND

Field of the Disclosure

The present disclosure relates to a platform for food service and/or preparation, and more particularly, to a platform that is supportable on a cooking vessel.

Description of the Related Art

During food service and/or preparation it is sometimes necessary to transfer food from a cooking vessel that is cooking food to another cooking vessel or to a serving tray or dish. Such an operation sometimes requires a cook or server to hold the dish or the cooking vessel to which food is to be transferred to as close as possible to the cooking vessel that is cooking the food, to ensure that the food can be transferred without spilling.

As can be appreciated, holding a dish or vessel for extended periods of time, such as when transferring large amounts of food from the cooking vessel to the dish or other cooking vessel, can cause fatigue and/or discomfort to a user, especially if that user is afflicted with a debilitating condition, e.g., arthritis, or if heat is being applied to the cooking vessel that is cooking the food.

SUMMARY

As can be appreciated, an adjustable platform that is supportable on a cooking vessel may prove useful in a cooking environment.

Embodiments of the present disclosure are described in detail with reference to the drawing figures wherein like reference numerals identify similar or identical elements. As used herein, the term "distal" refers to the portion that is being described which is further from a user, while the term "proximal" refers to the portion that is being described which is closer to a user.

An aspect of the present disclosure provides a platform for food service and preparation. The platform includes a base member that is supportable on a cooking vessel and a stabilizing member that supports the base member in a fixed orientation relative to the cooking vessel when the base member is supported on the cooking vessel.

Another aspect of the present disclosure provides a platform for food service and preparation. The platform includes a base member including at least one engagement member for engaging the base member with a cooking vessel. A stabilizing member is hingedly connected to the base member and is pivotable about the base member for moving the stabilizing member to at least one position for supporting the base member in a fixed orientation relative to the cooking vessel when the base member is engaged with the cooking vessel.

BRIEF DESCRIPTION OF THE DRAWING

Various embodiments of the present disclosure are described hereinbelow with references to the drawings, wherein:

FIG. 3A is a perspective view of the platform shown engaged with the cooking vessel, with a stabilizing member of the platform shown in an unadjusted configuration;

FIG. 3B is a side view of FIG. 3A;

FIG. 4A is a perspective view of the platform shown engaged with the cooking vessel, with the stabilizing member of the platform shown in an adjusted configuration; and FIG. 4B is a side view of FIG. 4A.

DETAILED DESCRIPTION

Detailed embodiments of the present disclosure are disclosed herein; however, the disclosed embodiments are merely examples of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

As noted above, an adjustable platform that is supportable on a cooking vessel may prove useful in a cooking environment, and such a platform is herein disclosed.

Figure 1:
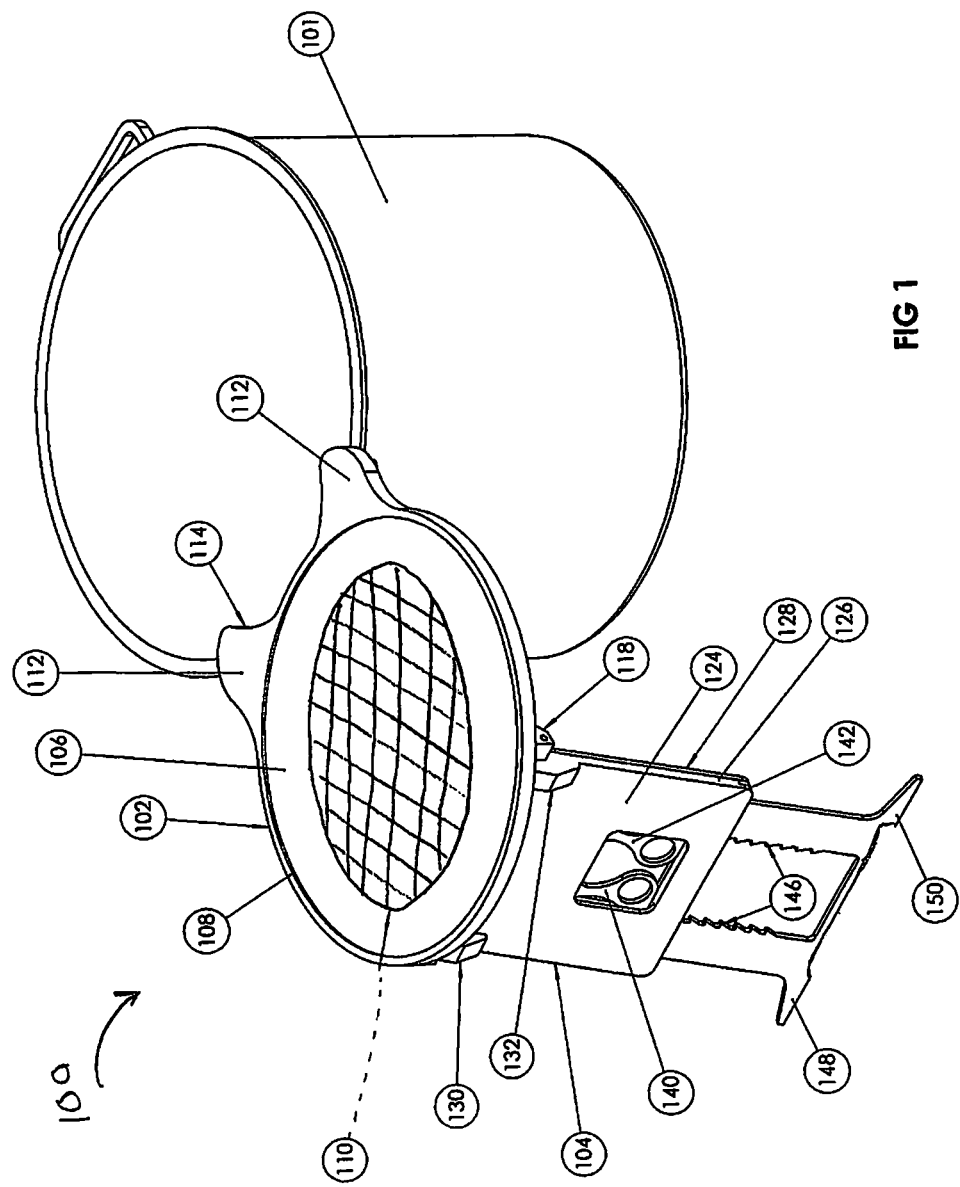
FIG. 1 is a perspective view of a platform shown engaged with a cooking vessel, in accordance with an embodiment of the present disclosure.

FIG. 1 is a perspective view of a platform 100 shown engaged with a cooking vessel (a pot) in accordance with an embodiment of the present disclosure. The platform 100 includes a base member 102 and a stabilizing member 104.

The base member 102 includes a generally cylindrical configuration, though other configurations (e.g., square, rectangle) are contemplated, and is configured to accommodate various sizes of cooking vessels and/or serving trays. For example, the base member 102 can have a diameter ranging from about 6" to about 12," or the base member 102 can have a diameter that is less than 6" and/or greater than 12."

The base member 102 includes a top portion 106 that is configured to support a cooking vessel 101, a serving tray, a plate or other type of device that may be used in a kitchen environment. For ease of explanation, the top portion 106 is described herein for supporting a plate (not shown).

The top portion 106 includes a circumferential lip 108 which extends from the top portion 106. The lip 108 is configured to keep the plate within the boundaries defined by the top portion 106. An optional non-slip pad 110 (shown via phantom lines) may be provided to prevent a plate that is positioned on the top portion 106 from slipping or sliding along the top portion 106 during the transferring of food from the cooking vessel 101 to the plate. The non-slip pad 110 can be removably attached to the top portion 106, or the non-slip pad 110 can be overmolded to the top portion 106.

The base member 102 is supportable on the cooking vessel 101. More particularly, a pair of engagement members 112 extend outwardly from the top portion 106 and are configured engage a top surface of the cooking vessel 101, thereby supporting the base member 102 in a substantially fixed orientation with respect to the cooking vessel 101. The pair of engagement members 112 are spaced apart from one another to accommodate various diameter cooking vessels. For example, the engagement members 112 can be spaced apart from one another at a distance ranging from about 4"

to about 8," or the engagement members 112 can be spaced apart from one another at a distance that is less than 4" and/or greater than 8."

One or more fingers 114 extend from the engagement members 112 and are configured to maintain the base member 102 of the platform 100 in an engaged configuration with the cooking vessel 101 as a user is transferring food from the cooking vessel 101 to a plate. In the instance where one finger 114 is provided on each of the engagement members 112, the finger 114 is configured to engage an inner edge of the cooking vessel 101, as shown in FIG. 1. In the instance where two fingers 114 are provided on each of the engagement members 112, one finger is configured to engage the inner surface of the cooking vessel 101 and the other finger is configured to engage an outer surface of the cooking vessel 101.

The finger(s) 114 can have any suitable height. For example, the finger(s) 114 can have a height that ranges from about ½" to about 1," or the finger(s) 114 can have a height that is less than ½" and/or greater than 1." The finger(s) 114 can have a height that allows the platform 100 to remain in a substantially fixed orientation when the platform 100 is in a folded configuration, such as when the platform 100 is being used as a hot plate, as will be described in greater detail below.

The engagement members 112 can be monolithically formed with the top portion 106, as in the illustrated embodiment. Alternatively, the engagement members 112 can be formed separately from the top portion 106 and subsequently attached thereto via one or more suitable attachment methods, e.g., rivets, pins, etc. Likewise, the fingers 114 can be monolithically formed with the connection members 112 (as in the illustrated embodiment), or the fingers 114 can be formed separately from the connection members 114 and subsequently attached thereto via one or more suitable attachment methods, e.g., rivets, pins, etc.

As can be appreciated, the top portion 106 can be supported on the cooking vessel 101 with only one of the engagement members 112, with more than two engagement members, or without the engagement members 112.

Figure 2:
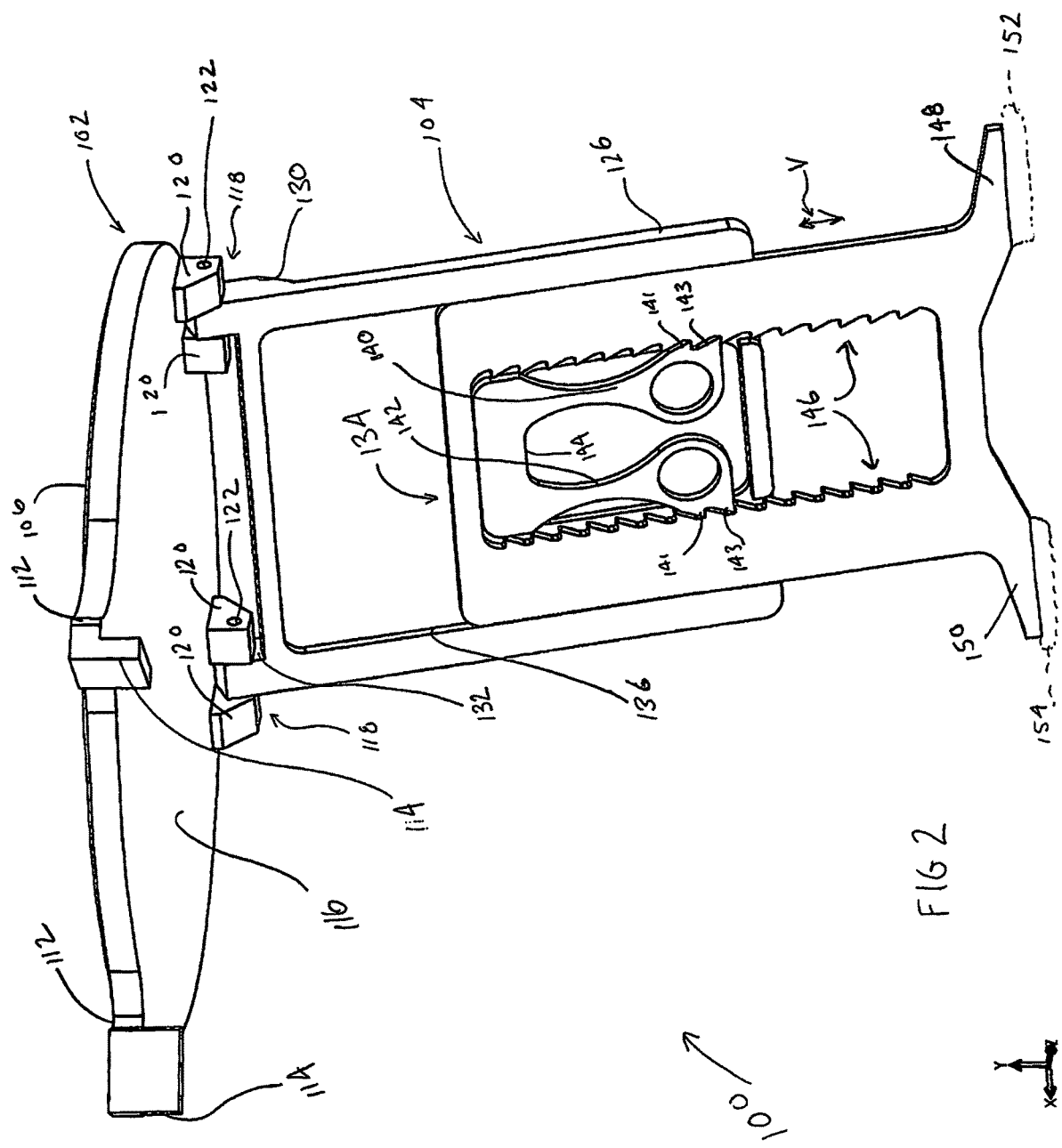
FIG. 2 is a perspective view of the platform shown disengaged from the cooking vessel.

Continuing with reference to FIG. 1, and with reference to FIG. 2, a bottom portion 116 of the base member 102 is provided with two hinges 118. Each of the hinges 118 includes two arms 120 that are connected to the bottom portion 116 via rivets, but other connection methods are contemplated.

Each of the two arms 120 supports a pin or rod 122 which connects to the stabilizing member 104 for pivotably connecting the base member 102 to the stabilizing member 104, thereby allowing movement of the stabilizing member 104 between folded and unfolded configurations. In the unfolded configuration, the stabilizing member 104 can be moved from an unadjusted configuration to one or more adjusted configurations, as will be described in greater detail below.

The stabilizing member 104 includes a housing 124 that is formed by riveting together spaced-apart wall portions 126 and 128. In an assembled configuration, the spaced-apart wall portions 126 and 128 can have a height that ranges from about 6" to about 12," or the spaced-apart wall portions 126 and 128 can have a height that is less than 6" and/or greater than 12."

Two extensions 130, 132 are coupled to the wall portion 126. The extensions 130, 132 can be connected to the wall portion 126 via rivets (as in the illustrated embodiment), screws or other suitable connection methods, or the extensions can be monolithically formed with the wall portion 126.

The extensions 130, 132 are fixedly connected to the bottom portion 116 of the base member 102 via the pins 122. Alternatively, the extensions 130, 132 can be configured to removably attach to the pins 122. For example, the extensions 130, 132 can have a corresponding groove, slit, or notch that is configured to press or friction fit onto the pins 122, which allows a user to attach and detach the stabilizing member 104 to and from the base member 102; although other attachment devices can be used.

Continuing with reference to FIG. 2, the housing 124 houses an adjustment mechanism 134 that is configured to increase a height of the stabilizing member 104, i.e., adjust the stabilizing member in the vertical direction, as shown by direction arrows "v." For illustrative purposes, in FIG. 2 the wall portion 128 of the housing 124 has been removed to illustrate the components of the adjustment mechanism 134.

The adjustment mechanism 134 includes a pair of monolithically formed opposing leg members 136, 138 that are positioned between an interior wall 136 that defines a cavity of the wall portion 126; this allows the leg members 136, 138 to slide within the cavity of the wall portion 126 when the wall portion 128 is connected to the wall portion 126.

The opposing leg members 136, 138 can have a height that ranges from about 4" to about 12." Thus, in the assembled configuration, the opposing leg members 136, 138 allow a user to increase a height of the stabilizing member 104 to about 4" to about 12" greater than a height of the stabilizing member 104, as described in greater detail below. The opposing leg members 136, 138 can have a height that is less than 4" and/or greater than 12."

Connected to the wall portion 126, via rivets, screws, pins, or the like, are a pair of retractable ratchet members 140, 142 (each including teeth portions 141, 143) that are connected to one another via a living hinge portion 144. The living hinge portion 144 biases the teeth portions 141, 143 of ratchet members 140, 142 into engagement with a respective plurality of teeth members 146 that are disposed on the leg members 136, 138. In the engaged configuration, the leg members 136, 138 are maintained in a locked configuration within the housing 124.

The living hinge portion 144 also allows a user to squeeze the ratchet members 140 142 inwardly toward each other to disengage the ratchet members 140, 142 from the respective plurality of teeth members 146 so that the leg members 136, 138 can be moved between different positions. The spacing between the plurality of teeth members 146 can range from about ⅟32" to about ¼," or less than ⅟32" and/or greater than ¼." A user can move and lock the opposing legs 136, 138 at increments corresponding to the spacing between the plurality of teeth members 146. As can be appreciated, less spacing between the plurality of teeth members 146 allows finer height adjustment of the opposing legs 136, 138 and better compatibility with various sizes of cooking vessels.

Each of the leg members 136, 138, at a distal end thereof, includes a foot portion 148, 150 that projects outwardly for providing additional stabilization when the stabilizing member 104 is moved to an open configuration, i.e., moved to an upright configuration. Optional non-slip stabilizing pads 152, 154 (shown in phantom in FIG. 2) can be provided on their respective leg members 148, 150, for providing more stabilization.

Operation of the platform 100 is described with reference to FIGS. 3A-4B.

Initially, the platform 100 can be in a stored configuration with the stabilizing member 104 in a folded configuration. That is, the stabilizing member 104 is positioned adjacent to the bottom portion 116 of the base member 102.

Applicant notes that in the folded configuration, the platform 100 can also serve as a hot plate, as in the folded configuration the stabilizing member 104 supports the base member 102 in a substantially fixed orientation, i.e., level. In certain instances, it may prove advantageous to provide the fingers 114 and the extensions 130, 132 with the same height, i.e., to prevent unintentional wobbling of the platform 100 when the platform 100 is being used as a hot plate.

When needed, a user can move the stabilizing member 104 to an unfolded configuration, as shown in FIGS. 3A and 3B. Once unfolded (or in the folded configuration), the user can engage the base member 102 with a top edge of the cooking vessel 101. More particularly, a user can position the top edge of the cooking vessel 101 between the two fingers 114 of each of the engagement members 112 to secure the base member 102 to the cooking vessel 101 (FIG. 3B), as described above.

Alternatively, in the instance where each of the engagement members 112 includes only one finger 114, each of the fingers 114 can engage the inner surface of the cooking vessel 101. Or, in the instance where the engagement members 112 are not provided with the fingers 114, the engagement members 112 can simply rest on the top edge of the cooking vessel 101. Or, in the instance where base member 102 is not provided with the engagement members 112, the bottom portion 116 can simply rest on the top edge of the cooking vessel 101.

Once the base member 102 is engaged with or secured to the cooking vessel 101, a user can place a plate or other cooking vessel on the top surface 106 of the base member 102 and transfer food from the cooking vessel to the plate or other cooking vessel.

As noted above, in certain instances it may be necessary to adjust the stabilizing member 104 to accommodate various size cooking vessels. In such an instance, the adjustment mechanism 134 may be used to adjust an overall height of the stabilizing member 104. More particularly, a user can squeeze the ratchet members 140, 142 towards each other to disengage the teeth portions 141, 143 of the ratchet members 140, 142 from the plurality of teeth members 146 that are disposed on the leg members 136, 138. In doing so, a user can then adjust the adjustment mechanism 134 accordingly, see FIGS. 4A and 4B, for example.

The platform 100 allows a user to safely and easily transfer food from the cooking vessel 101 to another cooking vessel or serving dish, without a user having to hold the another cooking vessel or the serving dish.

From the foregoing and with reference to the various figure drawings, those skilled in the art will appreciate that certain modifications can also be made to the present disclosure without departing from the scope of the same. For example, the two arms 120 may be movably connected to the bottom portion 116 of the base member 102. More particularly, the adjustment mechanism 134 (or one similar thereto) may be provided on the bottom portion 116 of the base member 102 to allow a user to move the two arms 120 relative to the bottom portion 116 of the base member 102, thereby allowing a user to adjust the stabilizing member 104 in the horizontal direction in addition to the vertical direction.

When multiple platforms 100 are used, the platforms 100 can be tandemly connected to one another. For example, one or more apertures may be provided on the base member 102 of a first platform 100 and may be configured to receive one or more corresponding fingers 114 that are provided on a second platform 100. A user can insert the fingers 114 from the second platform 100 into the apertures of the first platform 100 to connect the first and second platforms to each other. The adjustment mechanism 132 of the second platform 100 can used to adjust the height of the second platform 100.

In certain instances, it may prove advantageous to provide a storage or holding device that can be fixedly or removably attached to the platform 100 and which can be used to store or hold various kitchen items, e.g., thermometer, fork, ladle, potato masher, oven mitts, etc. Such a device can be fixedly attached to the platform 100 via screws, rivets or the like or can be removably attached to the platform 100 via a clip, Velcro®, etc.

While the finger(s) 114 have been described herein as being fixedly attached to the engagement members 112, it is within the purview of the present disclosure that the finger(s) 114 can be removably attachable to the engagement members 112.

Moreover, the fingers 114 can be replaced with magnets, clamps, hooks, adhesives, friction materials, brackets, clips, fasteners, pins, and/or other suitable attachment devices.

The pair of retractable ratchet members 140, 142 of the adjustment mechanism 134 can replaced with one or more other devices that may be used to adjust the stabilizing member 104. For example, a rotating knob or rollers may be operably coupled to the stabilizing mechanism 104 and may be configured to adjust the legs 136, 138. Alternatively, a friction fit may be used to house the legs 136, 138 within the stabilizing member 104.

Further, the stabilizing member 104 can be provided without the adjustment mechanism 134. As can be appreciated, this will depend on a manufacturer's preference, user preference, etc.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A platform for food service and preparation, the platform comprising:
 a base member that is supportable on a cooking vessel used over heat to cook food; and
 a stabilizing member that supports the base member in a fixed orientation relative to the cooking vessel when the base member is supported on the cooking vessel,
 wherein the stabilizing member comprises an adjustment mechanism, a housing, and a pair of opposing leg members that are slidably coupled to the housing,
 wherein the housing comprises a first wall portion and a second wall portion that enclose at least a proximal end of the pair of opposing leg members, with the pair of opposing leg members being configured to slidably move between the first wall portion and the second wall portion,
 wherein the adjustment mechanism comprises a pair of retractable ratchet members that are both housed within the housing, between the first wall portion and the second wall portion, and
 wherein each retractable ratchet member of the pair of retractable ratchet members is configured to engage at least one tooth of a plurality of teeth disposed on one leg member of the pair of opposing leg members, to adjust the stabilizing member in both a horizontal direction and a vertical direction.

2. The platform according to claim 1, wherein the base member comprises a lip having a circumferential configuration.

3. The platform according to claim 1, wherein the base member comprises at least one engagement member including at least one finger member configured to engage an inner edge of the cooking vessel.

4. The platform according to claim 1, wherein the base member comprises at least one engagement member including at least two finger members configured to engage at least one of an inner edge and an outer edge of the cooking vessel.

5. The platform according to claim 1, wherein the stabilizing member is hinged to the base member thereby allowing the stabilizing member to pivot between a first position substantially parallel with the base member and a second position forming an obtuse angle between the stabilizing member and the base member.

6. The platform according to claim 1, wherein the adjustment mechanism is configured to adjust a height of the stabilizing member, and each leg member of the pair of opposing leg members is disposed in a cavity of the stabilizing member.

7. The platform according to claim 1, wherein squeezing a retractable ratchet member of the pair of retractable ratchet members towards the other retractable ratchet member of the pair of retractable ratchet members releases the engagement from the at least one tooth of the respective plurality of teeth members that are disposed on opposing leg members, which that are slidably coupled to the housing of the stabilizing member.

8. The platform according to claim 1, wherein respective stabilizing pads are disposed on the opposing leg members to maintain the stabilizing member in a substantially fixed orientation when the base member is supported on the cooking vessel.

9. The platform according to claim 1, wherein the stabilizing member comprises a stabilizing pad that is configured to maintain the stabilizing member in a substantially fixed orientation when the base member is supported on the cooking vessel.

10. The platform according to claim 1, wherein the base member is configured to support a non-slip pad for maintaining one of another cooking vessel and a food tray in a substantially fixed orientation when one of the another cooking vessel and food tray is supported on the base member.

11. A platform for food service and preparation, the platform comprising:
a base member comprising at least one engagement member for engaging the base member with a cooking vessel used over heat to cook food; and
a stabilizing member hingedly connected to the base member, the stabilizing member pivotable about the base member for moving the stabilizing member to at least one position for supporting the base member in a fixed orientation relative to the cooking vessel when the base member is engaged with the cooking vessel,
wherein the stabilizing member comprises an adjustment mechanism, a housing, and a pair of opposing leg members that are slidably coupled to the housing,
wherein the housing comprises a first wall portion and a second wall portion that enclose at least a proximal end of the pair of opposing leg members, with the pair of opposing leg members being configured to slidably move between the first wall portion and the second wall portion,
wherein the adjustment mechanism comprises a pair of retractable ratchet members that are both housed within the housing, between the first wall portion and the second wall portion, and
wherein each retractable ratchet member of the pair of retractable ratchet members is configured to engage at least one tooth of a plurality of teeth disposed on one leg member of the pair of opposing leg members, to adjust the stabilizing member in both a horizontal direction and a vertical direction.

12. The platform according to claim 11, wherein the base member comprises a lip having a circumferential configuration.

13. The platform according to claim 11, wherein the engagement member includes at least one finger member that is configured to engage an inner edge of the cooking vessel.

14. The platform according to claim 11, wherein engagement member includes at least two finger members configured to engage at least one of an inner edge and an outer edge of the cooking vessel.

15. The platform according to claim 11, wherein the stabilizing member is hinged to a bottom portion of the base member allowing the stabilizing member to pivot between a first position substantially parallel with the base member and a second position forming an obtuse angle between the stabilizing member and the base member.

16. The platform according to claim 11, wherein the adjustment mechanism is configured to adjust a height of the stabilizing member, and each leg member of the pair of opposing leg members is disposed in a cavity of the stabilizing member.

17. The platform according to claim 11, wherein squeezing a retractable ratchet member of the pair of retractable ratchet members towards the other retractable ratchet member of the pair of retractable ratchet members releases the engagement from the at least one tooth of the respective plurality of teeth members, which are disposed on opposing leg members that are slidably coupled to the housing of the stabilizing member.

18. The platform according to claim 11, wherein respective stabilizing pads are disposed on the opposing leg members to maintain the stabilizing member in a substantially fixed orientation when the base member is engaged with the cooking vessel.

19. The platform according to claim 11, wherein the stabilizing member comprises a stabilizing pad that is configured to maintain the stabilizing member in a substantially fixed orientation when the base member is engaged with the cooking vessel.

20. The platform according to claim 11, wherein the base member is configured to support a non-slip pad for maintaining one of another cooking vessel and a food tray in a substantially fixed orientation when one of the another cooking vessel and food tray is supported on the base member.

* * * * *